United States Patent [19]

Nerwin

[11] 3,712,198
[45] Jan. 23, 1973

[54] SELF-PROCESSING CAMERA AND FILM PACK FOR USE THEREWITH

[75] Inventor: Hubert Nerwin, Rochester, N.Y.

[73] Assignee: Eastman Kodak Company, Rochester, N.Y.

[22] Filed: Oct. 2, 1970

[21] Appl. No.: 77,503

[52] U.S. Cl. ..................................................95/13
[51] Int. Cl. ...........................................G03b 17/50
[58] Field of Search..........95/13, 19, 22, 34; 96/76 R

[56] References Cited

UNITED STATES PATENTS

| | | | |
|---|---|---|---|
| 3,222,170 | 12/1965 | Eloranta | 95/13 X |
| 2,837,987 | 6/1958 | Land | 95/13 X |
| 3,227,058 | 1/1966 | Hochreiter | 95/34 R |
| 2,873,658 | 2/1959 | Land | 95/13 |
| 2,558,856 | 7/1951 | Land | 96/76 R X |
| 2,627,460 | 2/1953 | Land | 96/76 R X |
| 2,903,951 | 9/1959 | Land | 95/19 |

Primary Examiner—Samuel S. Matthews
Assistant Examiner—Fred L. Braun
Attorney—Robert W. Hampton and J. Addison Mathews

[57] ABSTRACT

A self-processing camera, and a film pack including an assemblage of stacked individual film units in a disposable casing receivable in such camera. Each of the film units includes a central portion of one thickness supporting photosensitive material, and end portions of greater thickness supporting a rupturable pod and an excess-fluid trap. The central portions of the stacked film units are housed in a flat condition behind an exposure aperture of the pack while the thicker pod and trap portions are housed in thicker pack end portions. The camera is adapted to receive the pack and has a retractile lens and shutter assembly collapsible into the central or recessed compartment of the pack. By thus recessing the pack, the thickness dimension of the camera may be reduced by allowing the retracted camera objective to be located correspondingly closer to the camera body, and by enabling both the collapsed camera bellows or the like and the retracted lens and shutter assembly to be at least partially received between the forwardly extending compartments at the ends of the pack.

8 Claims, 4 Drawing Figures

PATENTED JAN 23 1973

HUBERT NERWIN
INVENTOR.

BY J. Addising Mathew
Robert W Hampton
ATTORNEYS

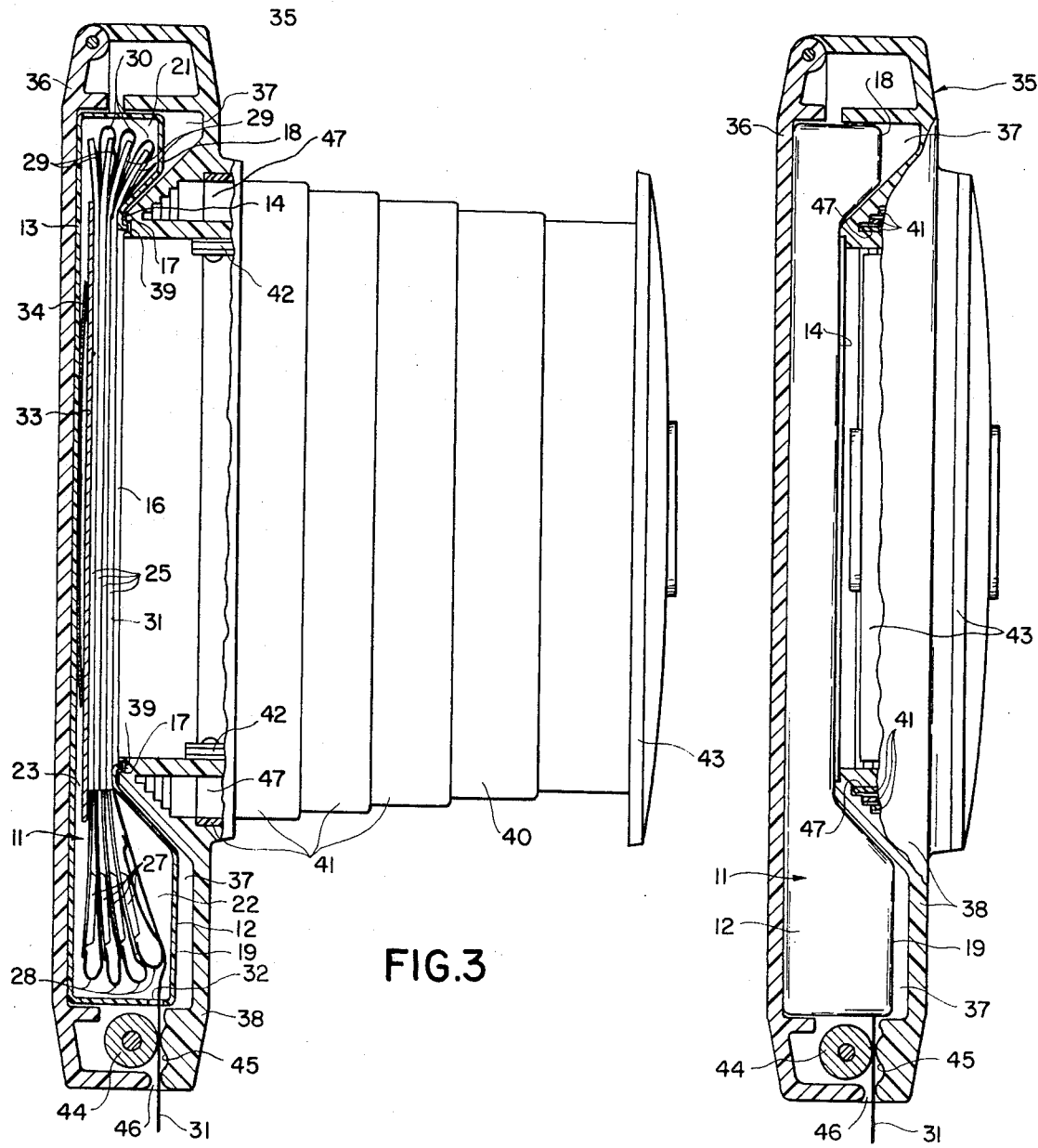

SELF-PROCESSING CAMERA AND FILM PACK FOR USE THEREWITH

BACKGROUND OF THE INVENTION

1. Field of the Invention

The present invention relates to photography and more particularly to self-processing cameras and to film packs or magazines and film casings for use with such cameras.

2. Description of the Prior Art

Almost since the inception of amateur photography, the prevailing trend, made possible by improvements in lenses, film emulsions, etc., has been toward reducing the size of cameras, for example by effecting corresponding reductions in the image or format size of film. In recent years, however, one of the more popular innovations in amateur photography has been the self-processing camera, which, for reasons well known to those skilled in the art, necessarily requires a large-format film, and a relatively long objective focal length, to provide a reasonably large finished print.

Presently commercial film packs adapted to be used with such cameras comprise a box-like casing of substantially uniform thickness having a flat forward wall member. Since the thickness of this pack is substantially uniform, and since the film units contained in the pack are thicker at the ends where fluid pods and traps are located, the entire length of the pack must be thick enough to accommodate the thickest portions of the units stacked on top of each other.

The camera adapted to receive such box-like film casings, in its most compact form, usually is provided with a collapsible bellows or the like to accommodate in the extended position the relatively long focal length dictated by the large film format, and to overlie in the retracted position the forward wall member of the film casing. Accordingly, the overall thickness of the film pack must increase the thickness or forward-to-rearward size of the camera at least by an amount equal to the thickness of the pack, both when the shutter and lens assembly is extended and when it is retracted. Moreover, because of physical dictations of the system, the camera can never be thinner than the thickness of the pack plus the objective thickness in the direction of the optical axis.

SUMMARY OF THE INVENTION

It is an object of the present invention to overcome some of the problems associated with the miniaturization of self-processing cameras and packs, at least in the thickness or front-to-back dimension, and to provide a relatively thin pack and camera of the self-processing type.

It is a further object of the present invention to provide a self-processing camera and film pack that, when used together and in a folded condition, are not necessarily limited in thickness by the combined measured thicknesses of the camera objective and the film pack at their thickest portions.

In a preferred embodiment of the present invention, a self-processing (or developing) camera uses a film pack or magazine comprising a casing containing an assemblage of stacked film units, each of which includes a pod of processing fluid at one end and a trap or excess fluid collector at the opposite end. The image recording or photosensitive portions of the stacked film sheets are relatively thin and are housed in flat condition in a central compartment of the film pack or magazine behind an exposure window. The pods and traps are thicker than the image recessing or photosensitive portions, and are received in enlarged casing compartments which extend forwardly from the central portion of the magazine casing. By thus recessing the central casing portion, the thickness or forward-to-rearward dimension of the pack or magazine, and of the camera, are reduced by allowing the extended camera objective and shutter to be located correspondingly closer to the camera back and by enabling both the collapsed camera bellows or the like and the retracted objective and shutter assembly to be at least partially received between the forwardly extending compartments at the ends of the magazine.

Various means for practicing the invention and other advantages and novel features thereof will be apparent from the following detailed description of an illustrative preferred embodiment of the invention, reference being made to the accompanying drawings in which like reference numerals denote like elements.

BRIEF DESCRIPTION OF THE DRAWINGS

In the accompanying drawings:

FIG. 3 is a partially cross-sectioned side elevational view showing the film pack depicted in FIGS. 1 and 2 loaded into a camera according to the present invention; and FIG. 4 is a partially cross-sectioned view corresponding generally to FIG. 3 but showing the depicted camera with its lens and shutter assembly retracted.

DETAILED DESCRIPTION OF THE PREFERRED EMBODIMENT

Figure 1:
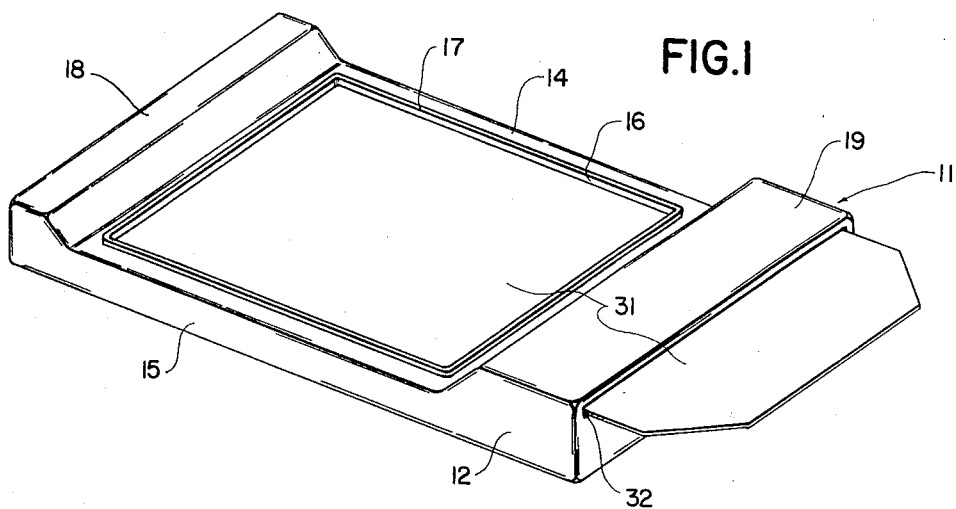
FIG. 1 is a perspective view of a self-processing film pack or magazine according to the present invention.

As best shown in FIG. 1 of the accompanying drawings, a film pack or magazine 11, according to a preferred embodiment of the present invention, comprises a casing 12 having a central relatively thin portion and first and second end portions, both of which, at least in the preferred embodiment, are thicker than the central portion. The magazine is specially configured in this manner to more efficiently contain an assemblage or plurality of film units that also, like the magazine, have a relatively thin central or photosensitive portion and first and second end portions thicker than the central portion.

In FIG. 1, the preferred magazine is illustrated lying on its back or flat wall member 13, (See FIG. 3) with a central and also substantially flat recessed front wall member 14 maintained in substantially parallel relation with the back wall member by supports such as side walls 15. This recessed front wall member 14 is provided with a rectangular exposure window 16 surrounded by a forwardly projecting light sealing lip 17.

The magazine is somewhat elongate and at its opposite ends 18 and 19 extends forwardly, or away from the back wall member, beyond the recessed front wall member 14 to define respective inner magazine compartments 21 and 22, shown in FIG. 3, which are substantially larger in a forward-to-rearward direction than the central magazine compartment 23 directly behind the central front wall member.

Figure 2:
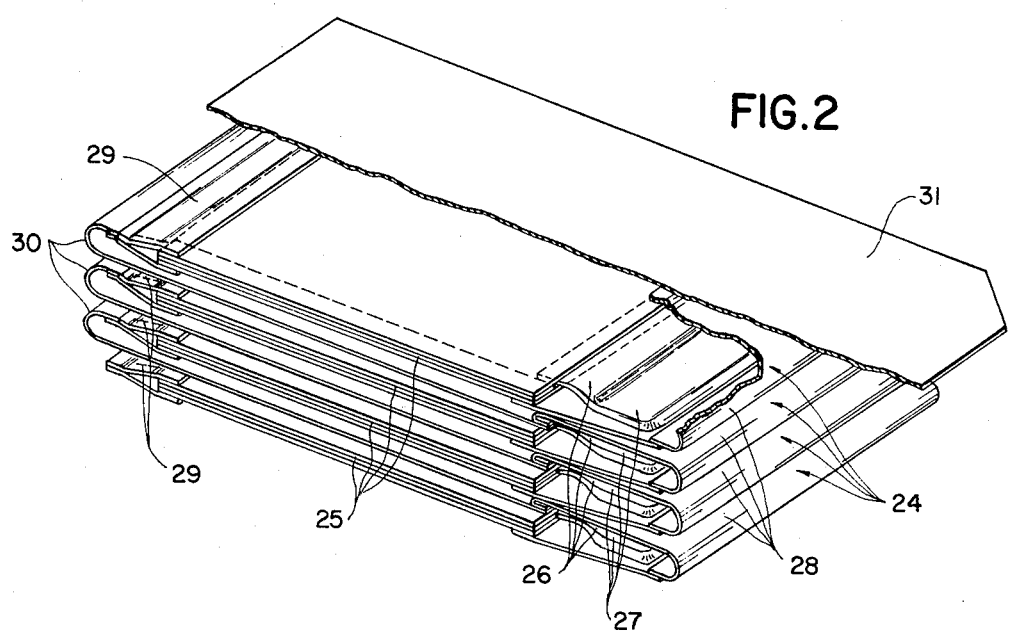
FIG. 2 is a perspective view of a film assemblage adapted to be incorporated into the magazine shown in FIG. 1.

By reference to FIG. 2, the film assemblage housed within the magazine casing will be seen to include four substantially identical film units 24, each of which comprises a laminated and integrally formed film member 25. The film units per se are not part of the present invention and are disclosed more completely, for example, in commonly assigned copending U.S. Pat. application Ser. No. 33,677, entitled PHOTOGRAPHIC APPARATUS, filed in the name of D. M. Harvey on May 1, 1970. Briefly, however, each of these illustrative film members comprises a first photosensitive sheet or element joined along its lateral edges to a transparent second or process sheet through which the photosensitive sheet is adapted to be exposed. A funnel member 26, comprising two pieces of web material connected along three sides, is joined along its fourth side to the leading end of each film member with the interface between the two layers of the funnel member in communication with the interface or between the two sheets of the film member. Each of the funnel members, in turn, is provided with a pod 27 containing a fluid for developing the photosensitive element.

After a film unit has been exposed, a pulling leader or tab 28 attached to one of the units is employed to pull that unit between two opposed pressure applying members generally in the camera and as will be described more fully below. This causes the pod to rupture and the processing fluid to be squeezed or spread from the pod and through the funnel member so that the fluid enters between the two sheets of the film member and is distributed uniformly between those sheets as the latter are then drawn between the same pressure applying members. At its trailing end, each film member is also provided with a trap or excess fluid collector 29 in communication with the interface between the two sheets; the function of this trap being to absorb excess processing fluid not needed to fill the predetermined space between the sheets. As is evident from FIGS. 2 and 3, each film unit is substantially thicker at its ends, because of these processing fluid pods and fluid collecting traps, than at any other point along the central portion of the unit.

Beyond their respective collector trap, the trailing end of all but the rearwardmost film member is connected to corresponding trailing strip 30, each of which, in turn, is joined to the leading end of the pulling leader of the next subsequent film unit in the assemblage. The leading end of the pulling leader of the forwardmost film unit similarly is joined to an opaque paper mask strip 31 which initially covers the exposure window in the magazine casing and which projects beyond the casing through an elongate slot 32 in the end wall of magazine compartment 22. As is more fully described in my U.S. application Ser. No. 77,474, entitled FILM ASSEMBLAGE, and filed on even date herewith, now abandoned the connections between the pulling leaders and the mask strip and trailing strips are adapted to separate when each successive pulling leader has been withdrawn to an accessible position by the withdrawal of the preceding mask strip or the preceding film unit.

With the film assemblage is loaded into the magazine casing 12, which is obviously provided with a removable wall member for assembly purposes, the central image-receiving portions of the four stacked film members, and the adjacent portion of the masking sheet, are received in the central magazine compartment 23 behind exposure window 16 and are biased forwardly by a pressure plate 33 under the influence of a leaf spring 34. To accommodate the additional thickness of the collector traps and the processing fluid pods, however, those elements are freely received in the respective end compartments 21 and 22 of the casing at opposite ends of recessed front wall member 14.

To load the film pack or magazine into the camera 35, shown in FIGS. 3 and 4, the camera cover door 36 is opened and the pack or magazine is installed in chamber 37 in the camera body member 38. Lip 17 surrounding the magazine exposure window is received in a continuous mating body-member groove 39 to provide a light-tight seal between the interior of the magazine and the camera bellows 40. The bellows of the illustrative camera is of the type disclosed in commonly assigned copending United States Patent application Ser. No. 33,679, entitled MOLDED PLASTIC BELLOWS filed in the name of D. M. Harvey on May 1, 1970, now U.S. Pat. No. 3,668,992, and comprises a plurality of telescoping light-tight bellows sections 41. As disclosed in U.S. Patent application Ser. No. 33,678 entitled LENS HOUSING SUPPORT LINKAGE FOR BELLOWS TYPE CAMERA, filed in the name of D. M. Harvey on May 1, 1970, now U.S. Pat. No. 3,665,678, a pair of opposed support linkage assemblies, partially shown at 42 in FIG. 3, are enclosed within the bellows and are adapted to support the camera lens and shutter assembly 43 in the extended position shown in FIG. 3. When the camera cover door is closed and latched by appropriate latch means, not shown, it engages the back wall member of the magazine and holds the latter against the rearwardly facing body member surface adjacent light sealing groove 39, thereby positioning the magazine in fixed relation to the extended camera lens. Additionally, closing the cover door moves a rotatable pressure roller 44 mounted thereon into opposed alignment with an arcuate pressure surface 45 of the camera body member at the opposite side of the leading end of the mask strip, which projects from the camera through opening 46.

After the camera has been loaded, the photographer grasps the accessible end of the mask strip and pulls it away from the camera. Accordingly, the leading end of the pulling leader of the forwardmost film unit is withdrawn between the opposed pressure members and through opening 46. When all of the available slack in that pulling leader has been absorbed, however, the strength of the joint between the mask strip and that leader is insufficient to move the corresponding film unit, which is temporarily held in place both by friction and also because the pressure plate must be displaced slightly against the resistance of spring 34 to allow the collector trap of that film member to enter the central magazine compartment. Consequently, the pulling leader separates from the mask strip as the photographer continues to pull the latter completely out of the camera. With the mask strip removed, pressure plate 33 biases the film members forwardly so that the marginal region surrounding the exposure area of the forwardmost film member bears against the inner surface of the central wall member surrounding the exposure window; thus locating the film emulsion surface in coincidence with a focal plane of the camera lens system. After the forwardmost film member has been exposed, its pulling leader is withdrawn in the same manner to effect processing of that film member as it is removed from the camera. As each film member is thus removed from the camera, it brings the pulling leader and the next film member into accessible position; thereby allowing the same process to be repeated until all of the available film members have been exposed and processed.

Since the central magazine portion is recessed and extends forward where it engages the camera, the excess thickness of the end portions of the film units can be supported forwardly of the focal plane, and the camera can be shorter in its overall thickness or forward-to-rearward dimension, even with its lens extended, than would be possible if it were loaded with a conventional rectangular magazine of uniform thickness throughout. Even more significant, however, is the fact that when the camera is closed, as shown in FIG. 4, both the lens and shutter assembly 43 and the collapsed bellows sections 41, received in body member recess 47, are partially located between the end compartments of the magazine. For example, if the camera and film magazine are of the dimensional proportions shown in the drawings, the rearward location of the image plane relative to the forward magazine extremities makes possible a reduction of approximately ½ of the cartridge thickness in the forward-to-rearward dimension of the extended camera and reduces the camera's corresponding closed dimension by approximately the same amount.

Referring more specifically to possible dimensions of the presently preferred film unit and cartridge, the central or film portion of the unit is approximately 0.020 inches thick while the pod and trap portions are 0.070 and 0.035 inches respectively at their thickest portions and including the support. Since the preferred pack comprises eight units and preferably includes one thickness of leader under each unit (in addition to the leader portions serving as supports) the preferred pack, including allowance for cartridge wall thicknesses, is 0.250 inches thick at the central portion and 0.700 and 0.400 inches thick at the pod and trap portions respectively. Since the units themselves may be made smaller (or larger) in all directions, more appropriate comparisons might be made in percentages, and in this respect the pod and trap portions preferably are thicker by about 2½ and 1½ times than the central portion. Conceivably, however, by staggering the pods and/or traps, for example, the pod section of the cartridge might be made as thin as 0.400 inches, or about 1½ times thicker than the central cartridge section, and the trap section might be 0.300 inches or 1¼ times thicker than the central section.

Of course different thicknesses would be predicated by different film units and leader systems and by other possible mechanisms incorporated into the cartridge, and the present application is intended to be directed also to these other cartridges and packs to the extent they incorporate the present invention.

In view of the above description, it should be apparent that an improved and more compact film cartridge and pack has been provided especially adapted for integral self-developing film units having enlarged end portions because of fluid pods, traps or the like, and which will accommodate such units in a more efficient manner than previously known, while at the same time accommodating a leader system for transporting the units from the cartridge. A compact camera also has been provided for use with the cartridge and which, at least in its ultimate form, can be folded to a thickness less than the combined thickness of the cartridge and camera objective and shutter at their thickest points. Other advantages and features have been set forth above and, in view of the above, will be apparent to those skilled in the art.

The invention has been described in detail with particular reference to preferred embodiments thereof, but it will be understood that variations and modifications can be effected within the spirit and scope of the invention.

I claim:

1. A magazine for containing an assemblage of substantially flat film units; each film unit having a central portion of a first predetermined thickness, and first and second end portions of greater thickness than the predetermined thickness of the central portion; the magazine comprising:

a substantially flat central section of a predetermined thickness for receiving the central portions of a plurality of film units in stacked relation; and, first and second end sections of greater thickness than the predetermined thickness of the central section, for receiving the first and second end portions of a plurality of film units in stacked relation.

2. A film pack including an assemblage of film units arranged in stacked relation and a casing receiving said stack of film units:

each of said film units being substantially flat and comprising a central portion of a predetermined thickness and first and second end portions of greater thickness than said predetermined thickness; and, said casing comprising a central section having a predetermined thickness greater than the combined thickness of the central portions of a given number of film units adapted to be contained therein but less than the combined thickness of either of the end portions of the same given number of film units.

3. A casing for containing an assemblage of substantially flat film units, each film unit having a central portion of predetermined thickness, a first end portion at least two times as thick as the central portion and a second end portion thicker than said central portion; the casing comprising:

a substantially flat central section of a predetermined thickness for receiving the central portions of a plurality of film units in stacked relation;

a first end section at least two times thicker than said central casing section, for receiving the first end portions of the film units in stacked relation; and a second end section thicker than said central casing section for receiving the second end portions of the film units in stacked relation.

4. A film pack including an assemblage of film units arranged in stacked relation, and a casing receiving said stack of film units:

each of said film units being substantially flat and defining first and second opposed sides, a central portion and end portions, the first side of said central and end portions lying substantially in one plane and the second side of said central portion lying in a different plane from the second side of said end portions, such that said film units are thicker at the end portions; and said casing being substantially flat and defining first and second sides, a central section and end sections, said first side of said central and end sections being substantially in one plane, said second side of said central section lying in a different plane from the second side of said end sections such that said casing is thicker at its end sections which extend from said first side to locations beyond said second side of said section.

5. A film magazine for self-processing film, said magazine including; a casing comprising wall means which cooperate to define a first internal magazine chamber provided with a forwardly facing exposure window, said first magazine chamber being adapted to house image receiving portions of a plurality of film members stacked in flat condition behind said exposure window, said casing also defining a second magazine chamber at one end of said first magazine chamber adapted to house a plurality of fluid-containing pods connected respectively to corresponding ones of said film members and located in stacked relation to one another, said second magazine chamber being of greater forward-to-rearward size than said first magazine chamber and extending forwardly beyond said first magazine chamber and beyond said portion of said wall means provided with said exposure window, and said casing also defining a third magazine chamber at the end of said first magazine chamber opposite said second magazine chamber, said third magazine chamber also being of greater forward-to-rearward size than said first magazine chamber and extending forwardly beyond said first magazine chamber and beyond the portion of said wall means provided with said exposure window.

6. A film magazine according to claim 5 including a pressure plate located rearwardly of said film members and resilient means biasing said pressure plate forwardly to urge the image receiving portions of said film members toward the portion of said wall means provided with said exposure window.

7. A camera adapted to accommodate a film magazine containing a plurality of self-processing film units, each of said film units having a central portion of a first predetermined thickness, and first and second end portions of greater thickness than the central portion, said film magazine comprising a box-like casing provided with a central section provided with a flat frontal wall member provided with an exposure window and end sections defining respective internal chambers extending forwardly beyond said flat frontal wall member at opposite ends thereof; said camera including; a body member provided with an internal compartment adapted to receive said casing, means for positioning said casing received in said compartment in fixed relation to said body member, a lens and shutter assembly, and support means supporting said lens and shutter assembly forwardly of said magazine in alignment with said exposure window thereof for movement between an extended position remote from said magazine and a retracted position at which said lens and shutter assembly is at least partially accommodated between said end sections of said casing received in said compartment.

8. A camera according to claim 7 including a collapsible bellows joining said body member and said lens and shutter assembly, said bellows being at least partially accommodated between said end sections of said casing received in said body member compartment when said bellows is collapsed.

* * * * *